(12) United States Patent
Leak et al.

(10) Patent No.: US 11,620,305 B2
(45) Date of Patent: Apr. 4, 2023

(54) RULESET ENGINE FOR GENERATING HOMOGENEOUS DATA SETS

(71) Applicant: salesforce.com, inc., San Francisco, CA (US)

(72) Inventors: Bradford Leak, Canton, GA (US); Shivakarthik Subramanyam, Dublin, CA (US); Arun Arumugam, Fremont, CA (US)

(73) Assignee: salesforce.com, inc

( * ) Notice: Subject to any disclaimer, the term of this patent is extended or adjusted under 35 U.S.C. 154(b) by 34 days.

(21) Appl. No.: 17/301,126

(22) Filed: Mar. 25, 2021

(65) Prior Publication Data

US 2022/0309074 A1    Sep. 29, 2022

(51) Int. Cl.
*G06F 16/25* (2019.01)
*G06F 16/178* (2019.01)

(52) U.S. Cl.
CPC ........ *G06F 16/258* (2019.01); *G06F 16/1794* (2019.01)

(58) Field of Classification Search
CPC .................. G06F 16/258; G06F 16/1794
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

*Primary Examiner* — Kris E Mackes
*Assistant Examiner* — Lin Lin M Htay
(74) *Attorney, Agent, or Firm* — LKGlobal | Lorenz & Kopf, LLP

(57) ABSTRACT

A method, performed by a server, for aggregating data in from devices within a complex network including receiving, at a network interface, an end data from a data source wherein the end data includes a source field having a source value, determining, by a processor, a subset of a ruleset for the data source in response to a source stanza within the ruleset, generating, by the processor, a results data structure in response to the end data and the subset of the ruleset wherein the results data structure includes a destination field generated in response to the source field and a transform instruction in the subset of the ruleset and a destination value generated in response to the source value and the transform instruction in the subset of the ruleset, and storing, within a memory, a destination value and the destination field as a key value pair.

18 Claims, 4 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,201,558 B1 * | 12/2015 | Dingman .............. G06F 16/252 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2018/0357049 A1 * | 12/2018 | Epstein ................ G06F 16/254 |
| 2019/0138345 A1 * | 5/2019 | Singh ................... G06F 16/211 |
| 2020/0026711 A1 * | 1/2020 | Blom ................. G06F 16/9024 |

* cited by examiner

RULESET ENGINE FOR GENERATING HOMOGENEOUS DATA SETS

TECHNICAL FIELD

Embodiments of the subject matter described herein relate generally to aggregating data payloads from complex systems. More particularly, embodiments of the subject matter relate to a method and apparatus for using a ruleset engine to aggregate information from heterogeneous data payloads from complex systems to generate homogenous data sets and relative availability scores.

BACKGROUND

Complex computing systems are generally composed of many diverse components which may interact with each other over a data network. For example, the internet is an example of a complex system having multiple dispersed independent systems such as computers, printers, servers, connected devices, sensors, and other devices which require communications between these systems. In large complex systems, the independent systems may be constantly changing and may be autonomous systems, not under the control of a single developer making data collection an increasingly difficult endeavor. A cost of increased autonomy of systems within the complex system is divergent data structures, such as JavaScript Object Notation (JSON) data or other declarative code, presented by these autonomous systems. A system's data structure may be simple or highly nested and complex. The complexity and heterogeneity of returned declarative data results in client code requiring awareness of the returned data structures. This may lead to hard coding of data awareness within the client code. Changes in upstream data or changes in client requirements would result in decreased velocity for layering functionality over microservices.

Likewise, many tools and metrics are used to gather data to determine the health or status of a component. This data is valuable for providing visibility into elements or sets of features. However, in a complex open system an aggregated and relative scoring method is required to understand relative health in a system-of-interest. Also, a high level of expertise may be needed to glean accurate health of the system-of-interest. A methodology of scoring aggregated metrics for elements belonging to a complex open system is necessary to provide a consistent and unbiased view of health into the system. Accordingly, it is desirable to develop a system for data collection having increased autonomy in the development and hosting functionality and to enable the agile reuse of existing services as building blocks for other functionality without the burden of monolithic development. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
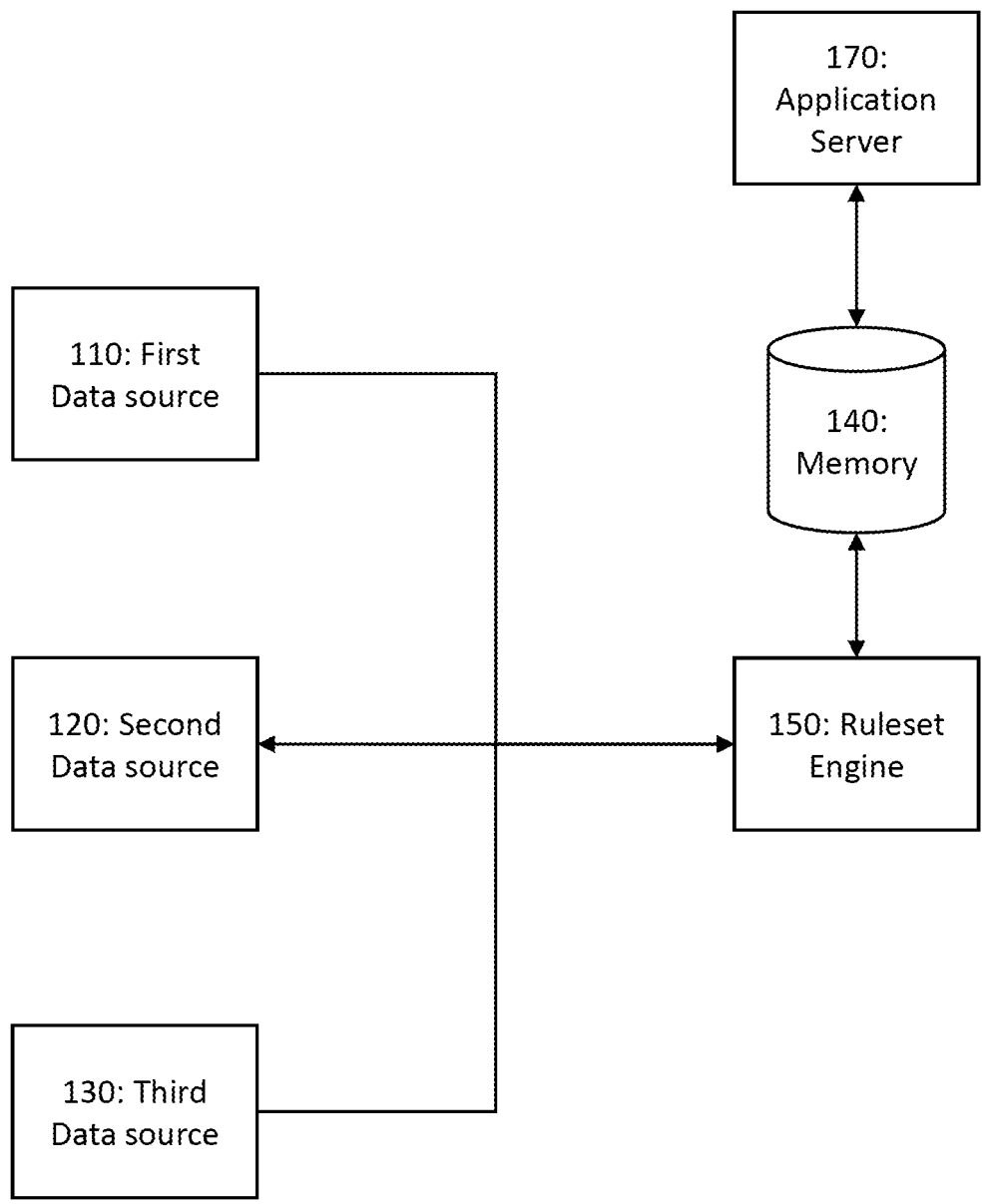
FIG. 1 shows an exemplary environment for use of a ruleset engine for generating homogeneous data sets from heterogeneous data according to an exemplary embodiment of the present disclosure.

Turning now to FIG. 1, an exemplary environment 100 for use of a ruleset engine for generating homogeneous data sets from heterogeneous data according to an exemplary embodiment of the present disclosure is shown. The exemplary environment 100 shows a complex system having a first data source 110, a second data source 120, a third data source 130, a ruleset engine 150, an application server 170 and a memory 140. Heterogeneous data is diverse data from different data sets on different devices that may be queried. Each data set from each data source may have different data structures. Each data source may be a different device and/or a different type of device coupled to the network.

In order to reduce coding time and increase developer efficiency, a ruleset engine 150, an engine or processor using a declarative ruleset, provides an abstraction layer between the heterogeneous data source data, or input, and a client code running on an application server 170 or the like. The ruleset may be stored in a memory 140 for access by the ruleset engine 150 and provides a dictionary of translations of field names to key names therefore enabling a client developer the power to enforce uniqueness in key names. The result is one or more flattened or unnested pair sets of data. This reduces the need for developers to hardcode processing of heterogeneous data and the abstraction allows increased opportunity for division of labor among developers and applications.

In some embodiments, a data source is a representative state transfer (REST) application program interface (API) that returns JSON. After performing a POST request on a data source that returns end point data, the ruleset engine 150 reviews the ruleset for review of fields and objects that are in the endpoint data. Each particular data source will have a dedicated section in the ruleset based on the endpoint. The ruleset engine 150 is designed to transform endpoint data into a standard data structure where each key is an un-nested set of key value pairs.

In response to the endpoint data, the ruleset engine 150 may generate results data that includes records and meta data. For each record in the endpoint data, the ruleset engine 150 consults a rule set stanza dedicated to that data source to make decisions on how to convert the object field into a flattened key-value pair. The top-level keys in the results data are determined by a key field rule from the data source's rule set. The value of the key field will be the top-level key in the results data.

In some embodiments, the ruleset engine 150 may process three generic types of end point data objects: simple key-value pairs, lists, and nested objects. The values in the data source's ruleset may provide guidance to the ruleset engine 150 on how to perform concatenation as well as key field name generation. If the field/object in the endpoint data is not included in the ruleset, the ruleset engine 150 may skip that field/object. If the field/object is a simple key-value pair and the key or field is included in the rule set, the key-value pair will be inserted into the results data. A nested field/object processed recursively as long as the field name is a value in the rule set. If the field/object is list, the rule set will instruct the ruleset engine 150 on how to convert the list into a string. A list conversion can be converted into a simple concatenated string or the list can be converted into a string to include the value and number of occurrences of that value within the list.

The transformation value in the ruleset may instruct the ruleset engine 150 to create a field, or transform, in the results data to ensure uniqueness of fields. For each data source, the ruleset may specify a field tag that may be either appended or prepended to the field name. If explicitly specified, derived field names may be translated into user defined strings, or translations to enable the user of the developer of rulesets to instruct the ruleset engine 150 to apply more descriptive field names if needed. The ruleset engine 150 may further include a meta data section in the results data wherein the meta data may include a unique list of fields, the value of key field, and the names of the data sources. The results data may be stored in the memory 140.

The stored data may include declarative metrics for the data sources wherein each declarative metric may indicate a failure condition. These declarative metrics may be accessible to an application server 170 performing a scoring device algorithm to determine a health or status of a data source or a device within the complex system. In some embodiments, the application server 170 and the ruleset engine 150 may be the same device for performing multiple functions and algorithms.

The declarative metrics may be valuable for providing visibility into performance or health of a device within the complex system. In a complex open system an aggregated and relative scoring method may be required to understand relative health in a system-of-interest. Also, user expertise may be required to glean accurate health of the system-of-interest within the complex system. A methodology of scoring aggregated metrics for elements belonging to a complex open system may be necessary to provide a consistent and unbiased view of health into the complex system.

To address this problem, a relative scoring system may be employed to allow a user to define any collection of elements as a system-of-interest. A failure condition for each device or system within the system-of-interest is defined. The application server 170 may function as a scoring engine to mines declarative data from the stored data within the memory 140 or from existing tools. The scoring engine may then determine if the data points meet the metric-specific failure condition and generate a set of scores for that metric. The scores for each system-of-interest may be categorized and aggregated. The relative nature of the scoring enables users to review impact of interconnected systems without requiring subject matter expertise of each data point and how it was generated. This scoring system may then advantageously present an unbiased measure of system of interest health. The scores of all instances of the same subsystem type may be review for problematic trends. The subsystem scoring may then provide insight to enable a user to further investigate a specific subsystem.

Figure 2:
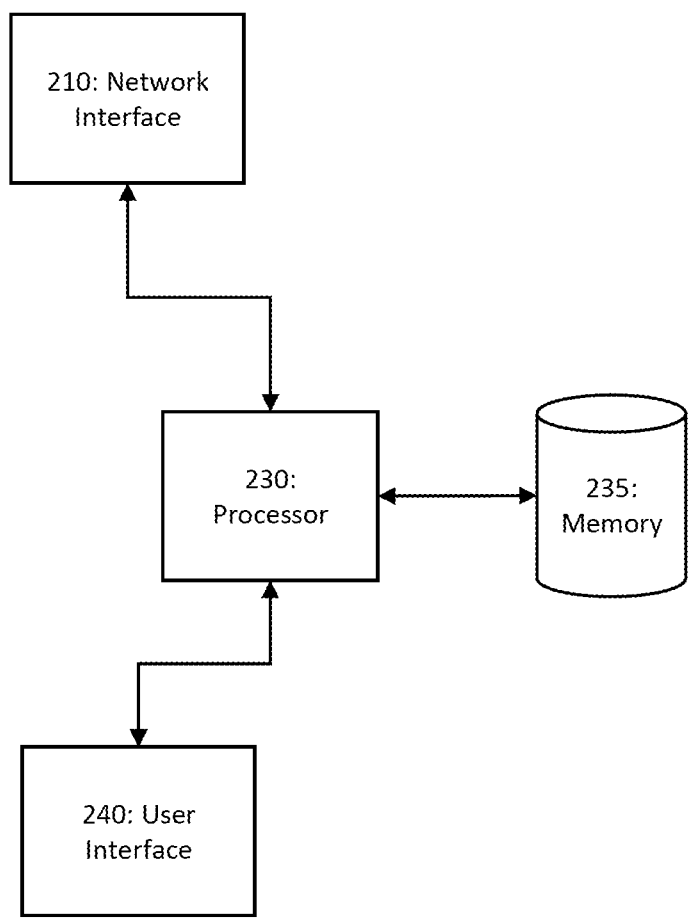
FIG. 2 is a block diagram of an exemplary system for use of a ruleset engine for generating homogeneous data sets from heterogeneous data according to an exemplary embodiment of the present disclosure.

Turning now to FIG. 2, a block diagram of a server 200 for use of a ruleset engine for generating homogeneous data sets from heterogeneous data according to an exemplary embodiment of the present disclosure is shown. The exemplary server 200 in a complex network may include a network interface 210, a processor 230, a memory 235 and a user interface 240.

The network interface 210 may be an electronic interface for transmitting and receiving data via an electronic network, such as a local area network, cellular network or the internet. The network interface 210 is configured for receiving data via the network from data sources wherein the data sources compose other elements of the complex network. The network interface 210 is also configured to transmitting requests for data, such as a POST requests, to other devices in the complex network. In some exemplary embodiments, each of the other devices, or types of devices, in a system of interest in the complex network are listed in a ruleset stored on the memory 235.

The memory 235 is configured to store a declarative ruleset including a source stanza for each device in the system of interest of the complex network. Each stanza provides instructions to translating fields in the data from the data source to generate a results data to form a portion of the homogeneous data set. The ruleset may further provide information on how to concatenate list data to generate a results data to add to the homogenous data set. The memory 235 may be further configured to store the homogeneous data set generated in response to the endpoint data received from the data sources via the network interface. The memory 235 may be coupled to the processor 230 such that the homogeneous data set may be accessed by the processor 230 for further processing.

The processor 230 is coupled to the network interface 210, the memory 235, and the user interface 240. The processor 230 is first configured to transmit a query, via the network interface, to data sources within the system of interest to request end data from these devices. In response the processor 230 receives the end data from the data sources and compares this data to a set of rules. Since different sets of data from different data sources, or different types of data sources, may have a different data structure and different data contented, the set of rules provides instructions to the processor 230 for generating a normalized a set of data and metadata from the received end data. The set of rules may also provide instructions to guarantee uniqueness in field names in resulting data set.

In response to receiving the end data from a data source, the processor 230 consults the ruleset to determine if the data source, or data source type is identified within the ruleset. The data source may be identified by a source stanza within the ruleset. If the data source is identified by a source stanza within the ruleset, the processor 230 may generate a standard results data structure and store this standard results data structure within the memory 235. If the data source is identified within the ruleset, the processor 230 next determined if the first received field within the received end data is listed in the ruleset. If the field is not listed, the processor 230 may skip this field and proceed to the next field in the received end data. If the field is listed, the processor 230 then determines if the field is a key-value pair, a list or a set of nested values. If a key-value pair, the processor may store the value in the standard results data structure. The processor may generate a field within the standard results data structure in response to instructions within the ruleset. If the field includes a list, the processor 230 concatenates the list according to the ruleset instructions and stores this data within the standard results data structure. If the field includes nested values, the processor 230 flattens the values in response to the ruleset instructions. In some instances of nested values or lists where instructions are not provided by the ruleset, the processor 230 may generate a standard entry according to a default instruction within the results data structure.

In addition, the processor 230 may be configured to determine an overall health of the system of interested in response to the results data. The results data may include failure metrics received from the data sources. The processor 230 may then determine a last failure result and an average failure result rate for a prior number of failure metrics for a data source and determine a data source failure score. The processor 230 may repeat this process for each data source in the system of interest and generate an aggregate score in response to the plurality of data source failure scores. The scores for each data source may be categorized and aggregated. The scores may be displayed to a user via a user interface 240. The relative nature of the scoring enables users to review impact of interconnected systems without requiring subject matter expertise of each data point and how it was generated. This scoring method can be used to present an unbiased measure of health which acts as a compass to enable the user to further investigate a specific subsystem. The scores of all instances of the same subsystem type may be review for problematic trends.

Figure 3:
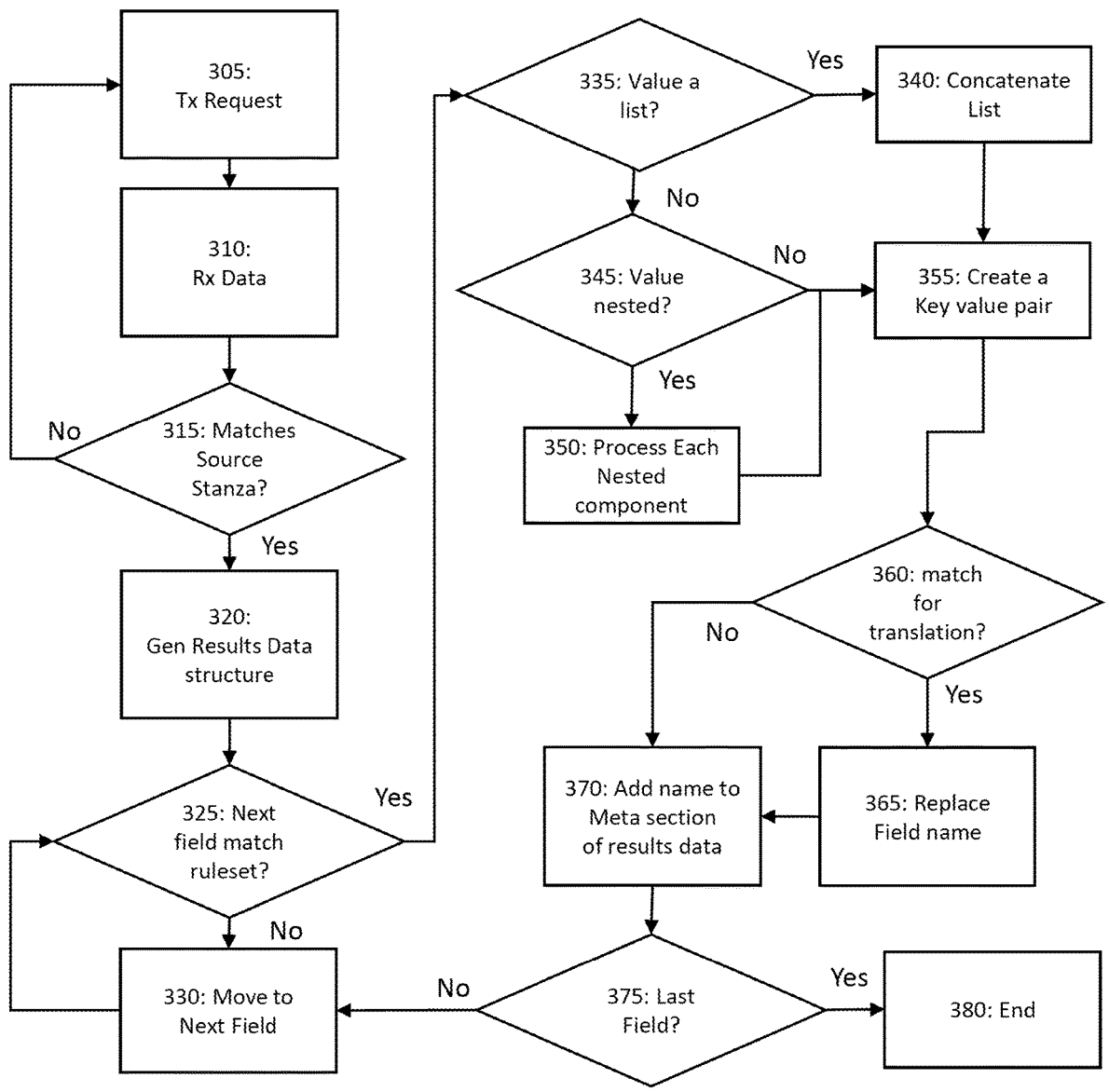
FIG. 3 is a flowchart of a method for use of a ruleset engine for generating homogeneous data sets from heterogeneous data according to an exemplary embodiment of the present disclosure.

Turning now to FIG. 3, a flowchart 300 is shown of a method for use of a ruleset engine for generating homogeneous data sets from heterogeneous data according to an exemplary embodiment of the present disclosure is shown. The exemplary method may be performed by processor performing a ruleset engine algorithm or the like. The processor may be coupled to a network interface and a memory wherein the memory is employed to store the ruleset data and the generated homogeneous data. The memory may be one or more memory devices such that the ruleset data and the generated homogenous data are stored on separate memory devices.

To generate the homogenous data according to the ruleset, the method is first configured to transmit 305 a request for data from a data source within the complex network. The request may be transmitted via a network interface and network, such as the internet, local area network, or wireless network. In response to the request for data, the method may next receive 310 the requested data from the data source via the network and network interface. In response to the received data from the data source, the method next checks to determine 315 if portions of the returned data match a source stanza in the ruleset for the particular data source. The method then generates 320 a results data structure in a standard format in response to portions of the data matching a source stanza in the ruleset.

After the results data structure is generated, the method begins to process each record from the returned data. The method starts with the first field and determines 325 if that field matches a rule in the ruleset. If the field does not match a rule in the ruleset, the method moves 330 to the next field in the returned data. If the field does match a rule in the ruleset, the method then determines 335 if the value in the field is a list. If the value is a list, the method then concatenates 340 the list based on a list rule in the ruleset. The method then creates 355 a key value pair from the concatenated list using the transform instructions in the ruleset. If the value is not a list, the method then determines 345 if the value in the field is nested. If the value is nested, the method processes 350 each nested component as instructed by the ruleset. The method then creates 355 a key value pair from each nested value using the transform instructions in the ruleset. If the value is not nested, the method then creates 355 a key value pair from the value of the object using the transform instructions in the ruleset.

In response to creating the key value pair, the method next determines 360 if the transformed field matches a translation in the ruleset. If the transformed field is a match, the field name is replaced 365 with the field name with translation from the translation rules in the ruleset. If the transformed field is not a match for a translation in the ruleset, the name of the field is then added 370 to the meta section of the results data.

The method is next configured to process the next field in the received data. The method first determines 375 if the last field that was processed is the last field of the received data. If the last processed field is the last field, the method then ends 380 and/or transmits a request to a different data source. If the last processed field is not the last field, the method moves 330 to the next field for processing.

Figure 4:
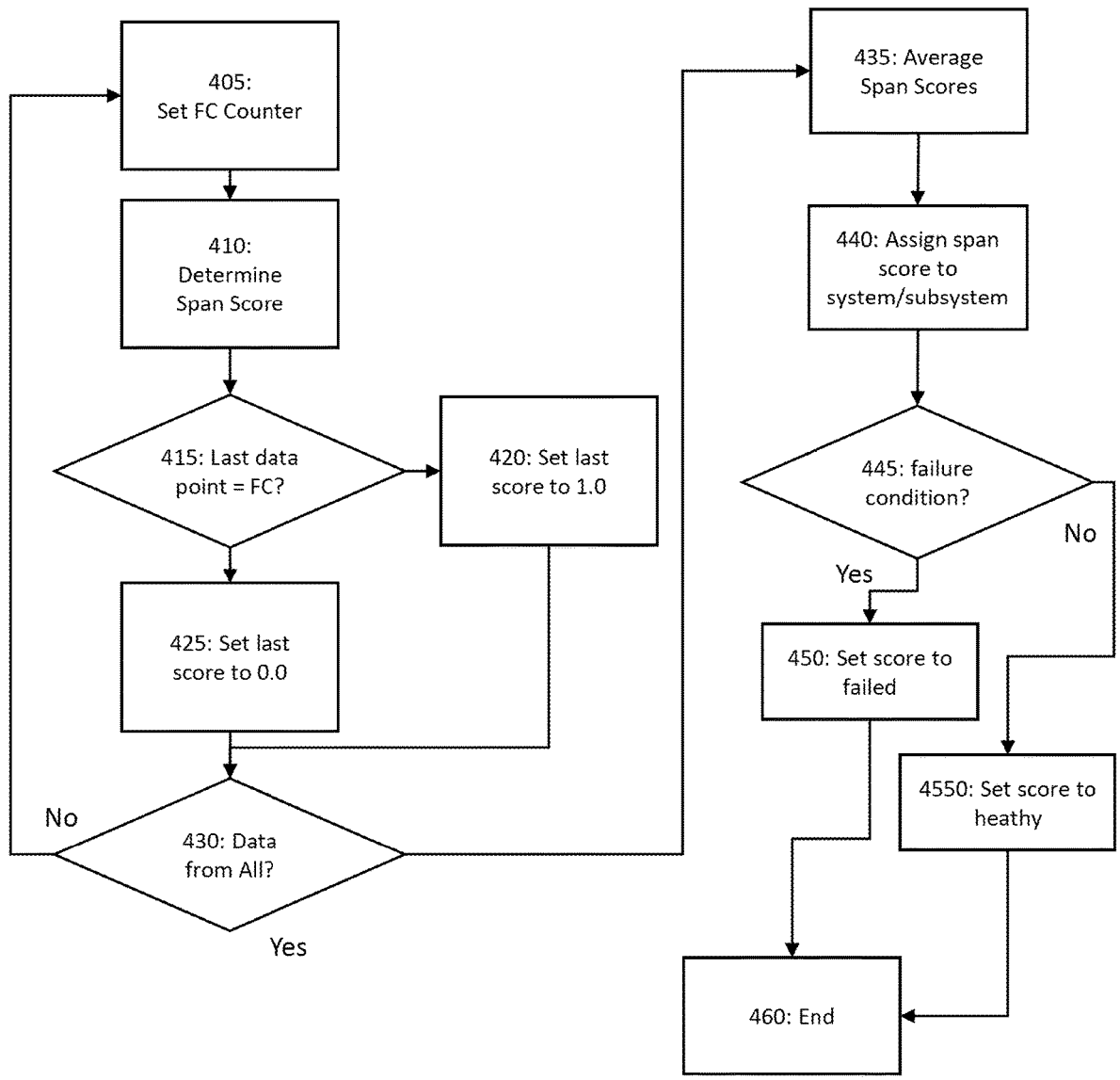
FIG. 4 is a flowchart of a method for use of a ruleset engine for aggregating metrics for complex systems into relative availability scores according to an exemplary embodiment of the present disclosure.

Turning now to FIG. 4, a flowchart 400 is shown of a method for aggregating metrics for complex systems into relative availability scores according to an exemplary embodiment of the present disclosure is shown. The exemplary method may be performed by processor coupled to a network for receiving data from a plurality of devices in a system of interest. The system of interest may be a subset of a complex system and may include devices of different types and categories. The data from the devices may include performance metrics. In some exemplary embodiments, the metrics may be data previously stored in the results data in response to the generation of homogeneous data. The method performs a scoring system algorithm to evaluate the health of a complex system using unique failure conditions for each element of the complex system to generate a weighted score to characterize a relative health of the complex system.

In some exemplary embodiments, the method is configured to perform a scoring engine algorithm to mine declarative data from the devices within the system of interest and generates metrics in response to the declarative data. The method then applies a formula to the metrics to generate a set of scores to characterize performance of overall complex system. The declarative data may include data exceeding metric specific failure conditions, average value over threshold, last value, last value exceeding threshold. The system metric categories may include combination of functional, performance, capacity, and configuration.

In performing the scoring engine algorithm, the method is first configured for setting 405 a failure condition counter to the number of data points that meet a failure condition. Each metric has one failure condition for analysis. The method reviews each data point in the declarative data and increments a count for each data point that meets the failure condition. The scoring engine uses the declarative data and a failure condition for each metric. Two scores may then be retained for the metric, the span score which is the average over the number of data points, and the last data point or the most recent score which is the value of the most recent data point.

The method next applies 410 a metric scoring formula to determine a span score. The span score for each set of data is based on the number of data points that equal the failure condition and number of data points. The metric span score may be equal to the inverse of the product of the datapoint count and the datapoint count minus the failure conditions met count. The range of scoring may be arbitrary and may be set by the maintainer of the scoring engine. In some embodiments, the scoring ranges could be from zero to one where zero is a complete failure and one is fully healthy system of interest or zero to one hundred where zero is complete failure and one hundred represents a fully healthy system of interest. Typically, a datapoint is binary with either a zero score or a one hundred percent score. Metrics may be based on any statistical measure such as number of standard deviations.

The method then determines 415 if the last data point meets the failure condition. If the failure condition is met, the method may then set 425 the last score to 0.0. If the failure condition is not met, the method sets 420 the score to 1.0. The method determines 430 if the metrics have been received from each device in the system of interest. If the data has not been received from each device, the method returns to setting 405 the failure condition for the next device.

Once the score has been set for each device in the system of interest, the method then performs an aggregation of the scores. In some embodiments, a developer may flag a metric or subsystem as critical. The span score for a system's category may be the average of the scores for that category. The most recent score may also be averaged for the category unless one of the metric's most recent score is zero in which case, the entire category's most recent score may be designated as zero regardless of the other metrics' scores. It is possible that not all categories for a system may be associated with metrics. In this case, the aggregated score may be flagged as null and not taken into consideration in any further aggregation. The categorized scores for each subsystem may once again averaged into an overall, categorized score for the system.

The perform the aggregation of the scores, the method first averages 435 the span scores for each category. An instance of a subsystem will be associated to a set of declarative metrics. Each set of metrics may be associated to one category from a set of health categories that will be defined by the scoring engine. In some embodiments, there may be only one category with metrics belonging to only one category. Many metrics can be associated to the same category. Examples of categorized metrics may include, functional, performance, capacity and configuration among others.

A span score is then assigned 440 to each system or subsystem in the system of interest. The method then determines if the current system score is equal to a failure condition. If the failure condition is met, the method sets 450 the current score for the system as failed. If the condition is not met, the system sets the current system score to healthy. The method is then ended 460. In some embodiments, if the failure condition is met 445, the method may then infer an overall, unbiased health of the system of interest. For example, the may provide a current score within a range of zero to one hundred where one hundred may be indicative of a completely healthy system of interest, to zero being indicative of failed. Any other score between zero and one hundred may indicate a less than healthy system of interest. In some instances a score may be provided having two decision points such as "failed" and a score out of 100 to indicate relative unhealthiness.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The various tasks performed in connection with the process may be performed by software, hardware, firmware, or any combination thereof. For illustrative purposes, the following description of process may refer to elements mentioned above. In practice, portions of process may be performed by different elements of the described system, e.g., component A, component B, or component C. It should be appreciated that process may include any number of additional or alternative tasks, the tasks shown need not be performed in the illustrated order, and process may be incorporated into a more comprehensive procedure or process having additional functionality not described in detail herein. Moreover, one or more of the tasks shown could be omitted from an embodiment of the process as long as the intended overall functionality remains intact.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method, performed by a server, for aggregating data comprising:
    receiving, at a network interface, an end data from a data source wherein the end data includes a source field having a source value, wherein the end data is indicative of a failure metric of the data source;
    determining, by a processor, a subset of a ruleset for the data source in response to a source stanza within the ruleset;
    generating, by the processor, a results data structure in response to the end data and the subset of the ruleset wherein the results data structure includes a destination field generated in response to the source field and a transform instruction in the subset of the ruleset and a destination value generated in response to the source value and the transform instruction in the subset of the ruleset;
    generating, by the processor, a system score in response to the destination value and a plurality of destination values generated in response to a plurality of end data received from a plurality of additional system data sources, wherein the system score is indicative of a system failure rate, and wherein the plurality of additional system data sources have diverse failure metrics; and
    storing, within a memory, a destination value and the destination field as a key value pair.

2. The method, performed by a server, for aggregating data of claim 1, wherein the source value is a list and wherein the destination value is a concatenated value generated in response to the list and the transform instruction in the subset of the ruleset.

3. The method, performed by a server, for aggregating data of claim 1 wherein the source value is a plurality of nested values and wherein the destination value is a flattened value generated in response to the plurality of nested values and the transform instruction in the subset of the ruleset.

4. The method, performed by a server, for aggregating data of claim 1, wherein the source value is a performance metric and wherein the destination value is a performance score generated in response to the performance metric and at least one prior performance score.

5. The method, performed by a server, for aggregating data of claim 1, wherein the source value is a performance metric and wherein the destination value is a system score generated in response to the performance metric and a second performance metric from a second data source.

6. The method, performed by a server, for aggregating data of claim 1, further including displaying, by a user interface, the destination value to a user in response to a user input.

7. The method, performed by a server, for aggregating data of claim 1, wherein the destination field is an alternate destination field generated in response to the destination data structure having a prior entry as provided by the transform instruction in the subset of the ruleset.

8. The method, performed by a server, for aggregating data of claim 1 wherein the results data structure includes a meta data indicative of the data source.

9. An apparatus for aggregating data comprising:
    a network interface to transmit a request for data and for receiving an end data from a data source in response to the request for data, wherein the end data includes a source field having a source value, wherein the end data is indicative of a failure metric of the data source;
    a processor to determine a subset of a ruleset for the data source in response to a source stanza within the ruleset, the processor further configured for generating a results data structure in response to the end data and the subset of the ruleset wherein the results data includes a destination field generated in response to the source field and a transform instruction in the subset of the rules and a destination value generated in response to the source value, the processor being further configured to a system score in response to the destination value and a plurality of destination values generated in response to a plurality of end data received from a plurality of additional system data sources, wherein the system score is indicative of a system failure rate, and wherein the plurality of additional system data sources have diverse failure metrics;
    a memory to store the system score, destination value and the destination field as a key value pair; and
    a display to graphically display at least one of the system score and the key value pair to a user.

10. The apparatus for aggregating data of claim 9, wherein the source value is a list and wherein the destination value is a concatenated value generated in response to the list and the transform instruction in the subset of the ruleset.

11. The apparatus for aggregating data of claim 9, wherein the source value is a plurality of nested values and wherein the destination value is a flattened value generated in response to the plurality of nested values and the transform instruction in the subset of the ruleset.

12. The apparatus for aggregating data of claim 9, wherein the source value is a performance metric and wherein the destination value is a performance score generated in response to the performance metric and at least one prior performance score.

13. The apparatus for aggregating data of claim 9, wherein the source value is a performance metric and wherein the destination value is a system score generated in response to the performance metric and a second performance metric from a second data source.

14. The apparatus for aggregating data of claim 9, further include a user interface for receiving a user input and wherein the key value pair is displayed to a user in response to the user input.

15. The apparatus for aggregating data of claim 9 wherein the destination field is an alternate destination field generated in response to the destination data structure having a prior entry as provided by the transform instruction in the subset of the ruleset.

16. The apparatus for aggregating data of claim 9, wherein the results data structure includes a meta data indicative of the data source.

17. A method for aggregating data in a complex network comprising:

receiving, by a network interface, a first end data from a first device and a second end data from a second device, wherein the first end data includes a first source field and a first source data and the second end data includes a second source field and a second source data, wherein the first end data is indicative of a failure metric of the first data source and the second end data is indicative of a failure metric of the second data source;

generating, by a processor, a results data structure in response to receiving the first end data;

generating, by the processor a first destination field in response to the first source field and a transform instruction in a ruleset and a first destination value generated in response to the first source data;

generating, by the processor, a second destination field in response to the second source field and a transform instruction in a ruleset and a second destination value generated in response to the second source data;

storing, on a memory, the first destination field and first destination value as a first key value pair and storing the second destination field and the second destination value as a second key value pair;

generating, by the processor, a system score in response to the first destination value and the second destination value destination wherein the system score is indicative of a system failure rate, and wherein the first end data and the second end data have diverse failure metrics; and displaying, on a user interface, the first destination value and the second destination value to a user in response to a user input.

18. The method for aggregating data in a complex network of claim 17 wherein the first destination value is a first performance metric and wherein the second destination value is a second performance metric and wherein the system score in response to the first performance metric and the second performance metric.

* * * * *